United States Patent [19]

Meier et al.

[11] 4,201,277
[45] May 6, 1980

[54] HYDRAULIC ACTUATION SYSTEM FOR A RAIL VEHICLE

[75] Inventors: Bruno Meier, Winterthur; Otto Luginbuhl, Oberthal, both of Switzerland

[73] Assignee: Schweizerische Lokomotiv-und Maschinenfabrik, Winterthur, Switzerland

[21] Appl. No.: 964,361

[22] Filed: Nov. 28, 1978

[30] Foreign Application Priority Data

Nov. 28, 1977 [CH] Switzerland ............... 014531/77

[51] Int. Cl.² ............................................. F16D 65/56
[52] U.S. Cl. ............................ 188/196 D; 188/153 R; 188/196 A; 188/196 V; 188/203
[58] Field of Search ....... 188/153 R, 196 A, 202–203, 188/196 D, 196 V

[56] References Cited

U.S. PATENT DOCUMENTS

| 3,878,924 | 4/1975 | Nadas ..................... 188/203 |
| 4,022,304 | 5/1977 | Spalding ................. 188/203 |

FOREIGN PATENT DOCUMENTS 546895  3/1974  Switzerland.

Primary Examiner—Douglas C. Butler
Attorney, Agent, or Firm—Kenyon & Kenyon

[57] ABSTRACT

The hydraulic activators are provided with a relief valve which serves to permit communication between the disengaging cylinder chamber and the work cylinder chamber. The open position of the relief valve occurs when the release apparatus for the rotatable friction brake member is closed. The closed position of the relief valve occurs after the rotating brake is released. The relief valve can be mounted in the release apparatus of the working piston.

16 Claims, 12 Drawing Figures

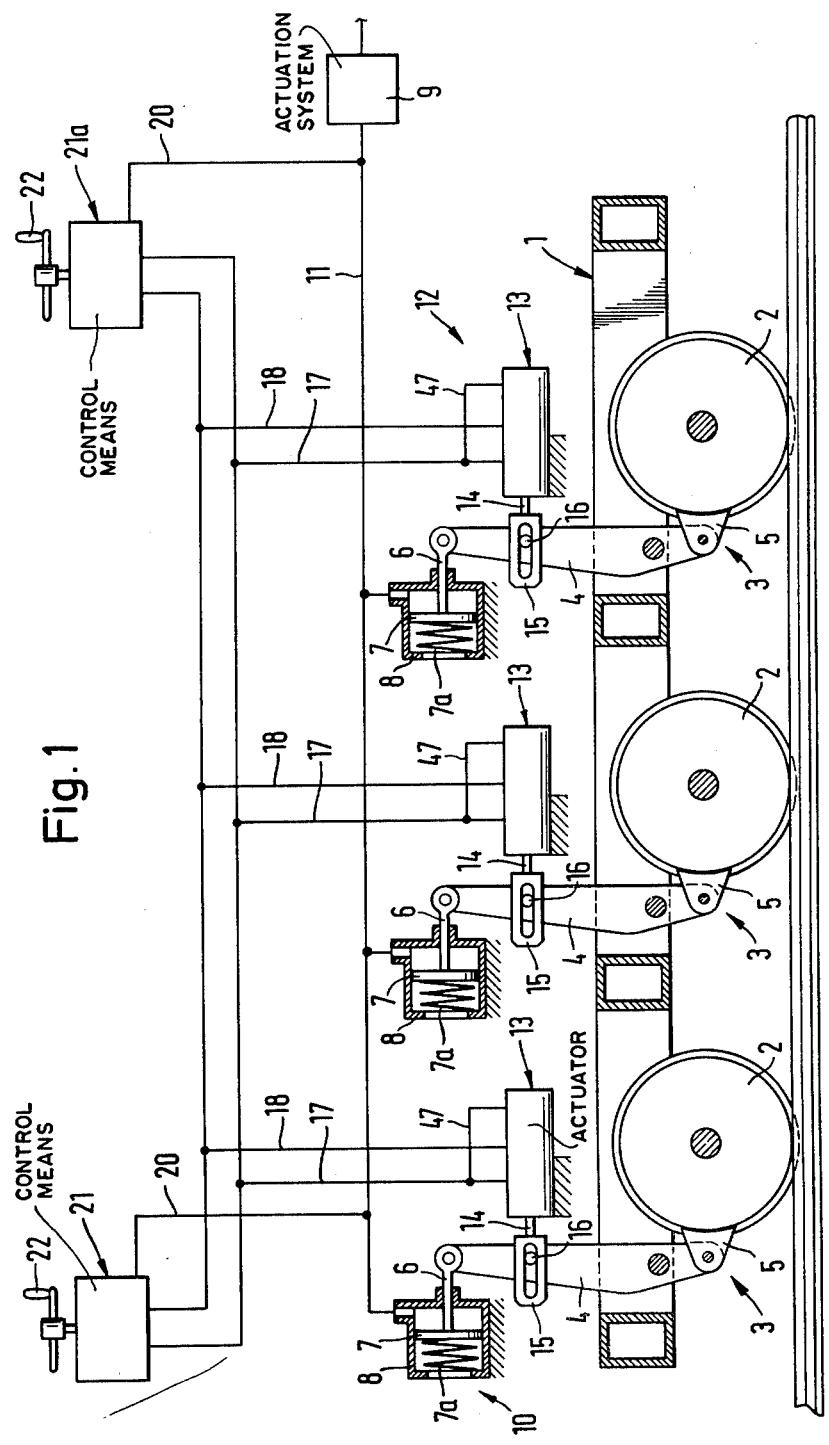

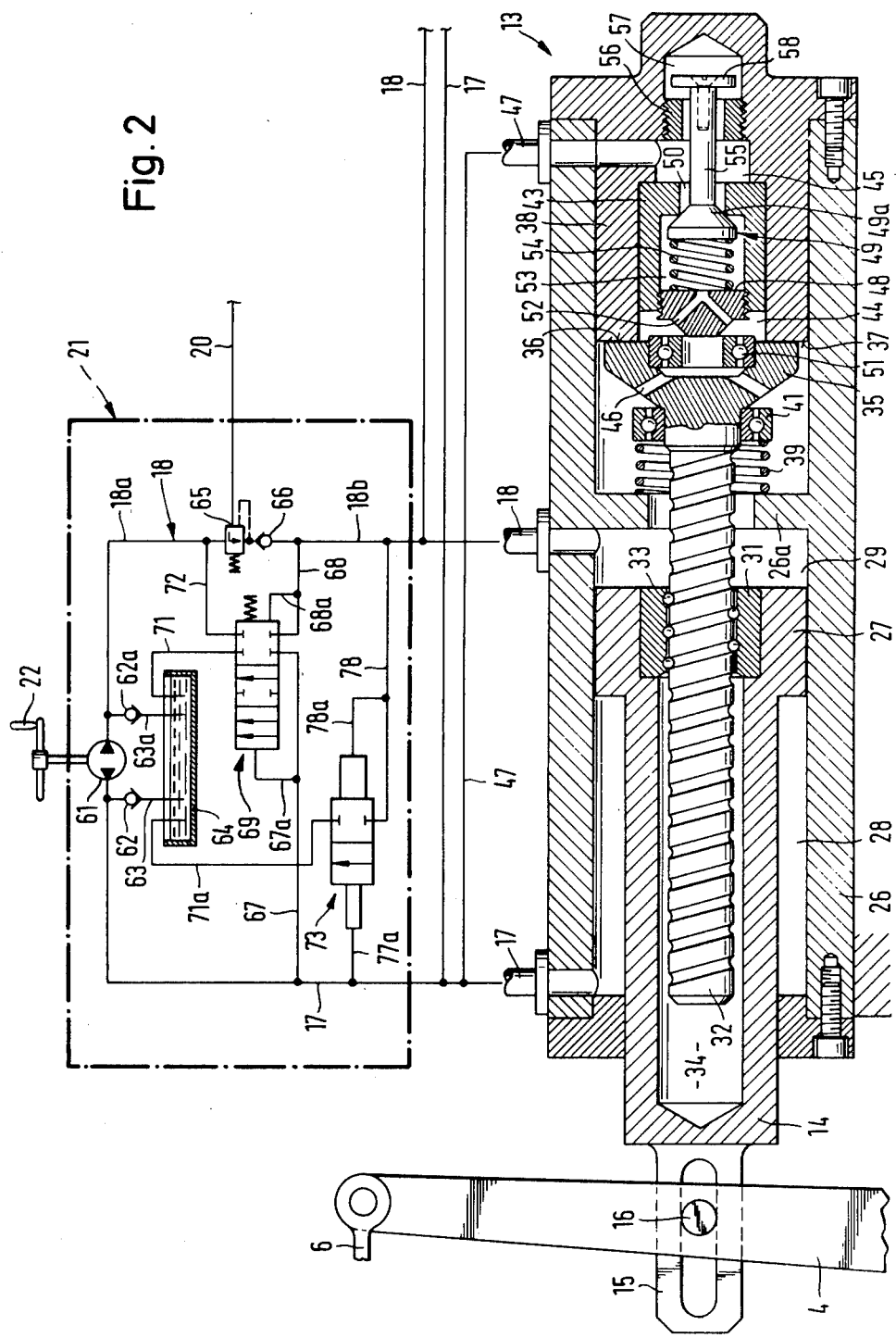

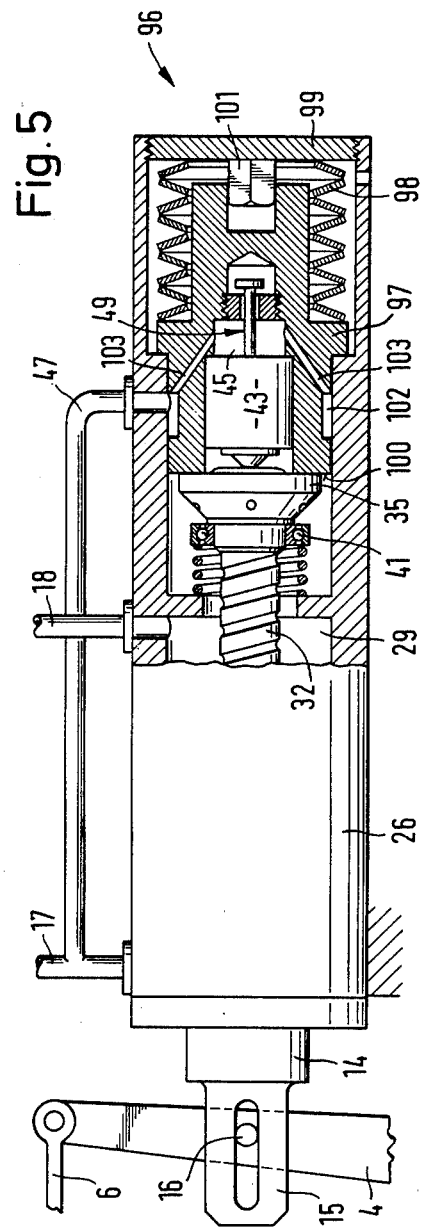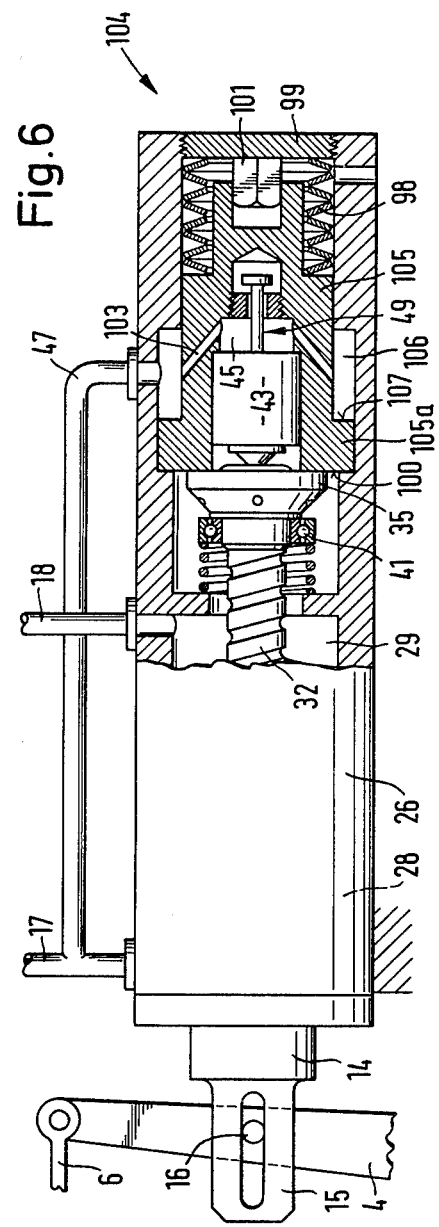

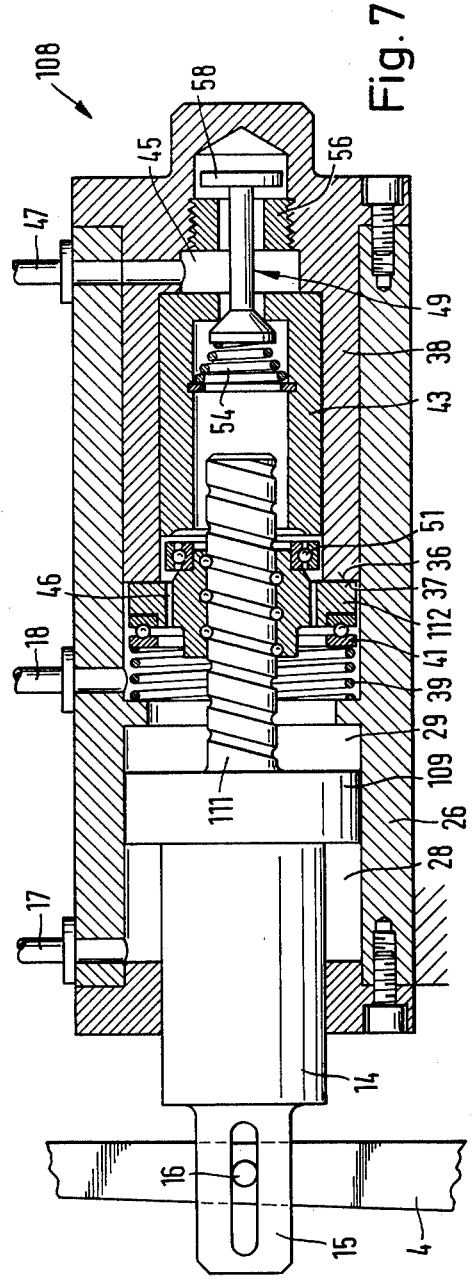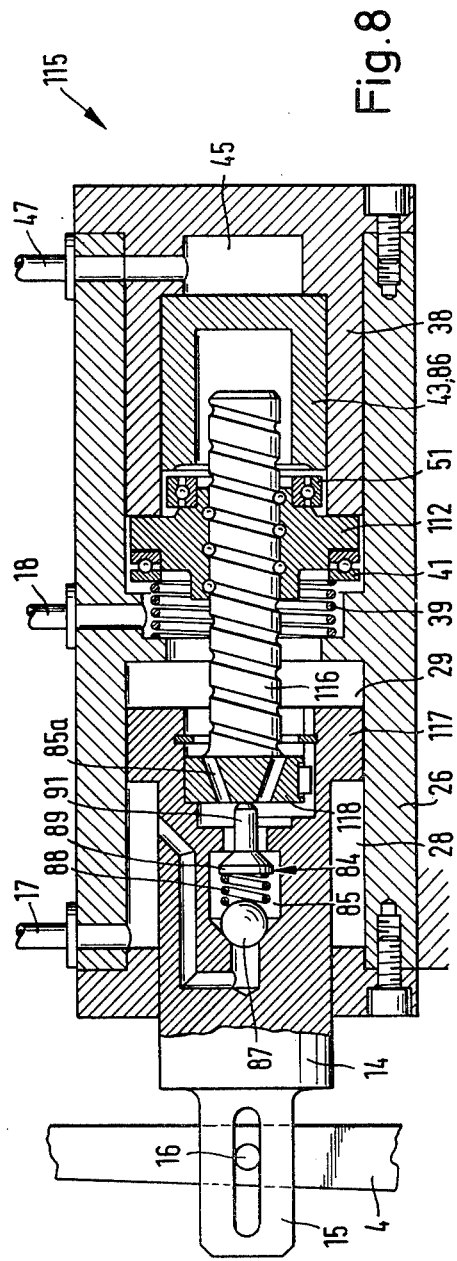

HYDRAULIC ACTUATION SYSTEM FOR A RAIL VEHICLE

The invention relates to a hydraulic actuation system, particularly, for a handbrake of a rail vehicle.

Heretofore, various types of actuation systems have been employed for actuating the brakes of a rail vehicle. On one known type of system use is made of at least one double-acting reciprocating actuator comprised of a work piston having a return stop and a reversible screwthreaded connection which couples the piston with a rotatable connecting member maintained at least substantially axially immobile in the cylinder. The connecting member is adapted to co-operate with a rotating friction brake which is releasable by means of a release device which includes a disengaging piston. This latter piston co-operates with the connecting member and separates, on the one hand, a work cylinder chamber bounded by the disengaging piston and the work piston and adapted to be energized for operative actuation of the work piston from, on the other hand, a disengaging cylinder chamber adapted to be energized to release the rotating friction brake.

In a known actuator of this kind, the work piston separates the work cylinder chamber from a return cylinder chamber which is adapted to be pressurized for the return and which is connected together with the disengaging cylinder chamber to a common actuating line (Swiss Patent Specification No. 546 895). In constructions of this kind, the work piston return movement initiated upon release of the rotating friction brake may be jerky since the pressure in the return cylinder chamber and disengaging cylinder chamber drops simultaneously upon release of the return stop. Thus, the disengaging piston is pushed back by the force acting on the work piston and the rotating friction brake therefore comes into operation again. Correspondingly, the work piston return movement is interrupted until a fresh supply of pressure medium to the disengaging cylinder chamber initiates further intermittent return movements of the work piston. In systems having a number of such actuators connected in parallel, it is difficult to operate the actuators in parallel since the return stops do not release simultaneously. Instead, one of the work pistons at a time completes the full return movement as far as a back stop, and only then can a pressure able to initiate a return movement of another work piston build up in the actuation system.

Accordingly, it is an object of the invention to provide a hydraulic actuation system in which the return movement of a work piston is continuous.

It is another object of the invention to provide a hydraulic actuation system in which a plurality of parallel connected actuators are able to operate in synchronism.

It is another object of the invention to provide a hydraulic brake actuation system for a handbrake of a rail vehicle which is capable of smooth continuous operation.

Briefly, the invention provides a hydraulic brake actuation system for a rail vehicle which is comprised of at least one double-acting reciprocating actuator for selectively engaging and dis-engaging a brake. The actuator includes a cylinder and a work piston slidably mounted in the cylinder to define a return cylinder chamber on one side and a work cylinder chamber on an opposite side. In addition, a screw-threaded spindle extends from the work piston while a reversible screw-threaded connection is used between the spindle and work piston to permit rotation of the spindle relative to the piston. Also, a friction brake member is mounted on the spindle and has a rotatable brake surface. A release means is also provided which includes an insert in the cylinder with a stationary brake surface opposite the rotatable brake surface, and a disengaging piston slidably mounted in the insert to selectively move the brake member away from the insert. This latter piston also defines a disengaging cylinder chamber in the insert while being disposed in facing relation to the brake member to separate the disengaging cylinder chamber from the work cylinder chamber.

In accordance with the invention, a relief valve (throughflow element) is disposed between the disengaging cylinder chamber and the work cylinder chamber. This relief valve is movable between a closed position for blocking communication between the disengaging cylinder chamber and the work cylinder chamber with the braking surfaces in spaced relation and an open position for communicating these two chambers with each other with the brake surfaces in contact with each other.

The system ensures by simple means that a pressure, less than the pressure in the disengaging cylinder chamber only by the pressure drop caused by the relief valve, builds up in the work cylinder chamber. Consequently, an appropriate increase in the pressure in the disengaging and work cylinder chambers leads to the application of a force to the work piston which opposes the external force initiated by way of the work piston and which, in a manner to be described hereinafter, increasingly reduces the loading of the screwthreaded connection retained by the rotation friction brake. Correspondingly, with the friction brake in the released state and with the relief valve in the closed state, the pressure operative in the work cylinder chamber receives the external force acting on the work piston and the work piston makes a return movement which is controlled in accordance with the quantity of pressure medium, discharging from the work cylinder chamber.

According to a constructionally very simple embodiment, the relief valve can be disposed in the disengaging piston. In another embodiment, the relief valve can be disposed in such a part of the cylinder as can be energized by the pressure in the work cylinder chamber.

In still another embodiment, the relief valve can be disposed in the work piston. Conveniently in this case, the relief valve is coupled with a non-rotatable connecting member of the screwthreaded connection, the latter member being guided for axial movement in the work piston.

In still another embodiment, in order to ensure that external influences, such as temperature variations, cannot accidentally alter the force acting on the actuator, particularly when the work piston has been locked, the insert in which the disengaging piston is guided is slidably mounted in the cylinder. In this case, the release means includes a spring to bias the insert towards the spindle against the pressure in the work cylinder chamber and means for preventing rotation of the insert in the cylinder.

Conveniently, in order to have differentiated actuation of the system with piston forces differing in accordance with operation, the cylinder insert resembles a differential piston having an annular piston surface adapted to be acted upon by the same pressure as the disengaging piston experiences.

In another embodiment which leads to a very simple-to-control and continuous return movement of the work piston, the actuator is controlled by a hydraulic control means which includes means for supplying pressure medium to the chambers of the actuator, means for discharging pressure medium from the chambers, a pair of control lines respectively connected to the work cylinder chamber and disengaging cylinder chamber and a release valve between the control lines. This release valve is connected to the work cylinder chamber and is responsive to a predetermined pressure difference between the two cylinder chambers to move from a closed position into at least one open position to communicate the work cylinder chamber and the means for discharging the pressure medium.

Conveniently, the work cylinder chamber is connected to a means for regulating at least the quantity of pressure medium discharging from the work cylinder chamber. This regulating means can be a separate dispensing unit or, according to another feature of the invention, can take the form of a variable-speed pump forming part of a control means.

Very conveniently, for accelerated release, the work cylinder chamber is connected to a quick release valve which is located between two control lines connected one each to the work cylinder chamber and the disengaging cylinder chamber. This quick release valve is responsive to a predetermined pressure difference between the two chambers to move from a closed position into an open position to communicate the work cylinder chamber and a substantially pressureless discharge line for the pressure medium. This feature shortens what would otherwise be the relatively long phase of the release operation when only a reduced external force is still acting on the work piston.

Advantageously, in systems comprising two control means with an actuator, the actuator is connected to the control means by way of a two-circuit valve adapted to be changed over between two operative positions each connecting the actuator to whichever control means has been operated. Consequently, and more particularly in rail vehicles in which control means are provided in both driving cabs, the two systems can be completely separated from one another. Thus, for instance, in the event of leaks or a damaged connecting line in one control means, the actuator can be operated by way of the other such control means.

These and other objects and advantages of the invention will become more apparent from the following detailed description and appended claims taken in conjunction with the accompanying drawings in which:

FIG. 1 illustrates a partial schematic view of a bogie which forms part of a rail vehicle and which has actuating systems according to the invention;

FIG. 2 illustrates a schematic view of a control means and a reciprocating actuator of a system according to the invention;

FIG. 5 illustrates a view of a modified actuator having a slidably mounted release means in accordance with the invention;

FIG. 6 illustrates a view of a modified actuator using a differential piston for the insert of the release means in accordance with the invention;

FIG. 7 illustrates a view of a modified actuator having a screw threaded spindle fixed to the work piston in accordance with the invention;

FIG. 8 illustrates a view of a modified actuator having a relief valve in the work piston in accordance with the invention;

In the accompanying drawings like reference characters indicate like parts.

Figure 2A:
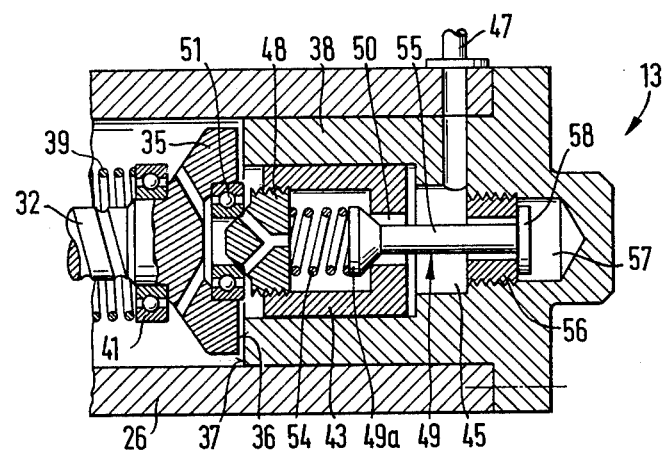
FIG. 2a illustrates a detail of FIG. 2 in a different operative position.

Referring to FIG. 1, the parts which are important for a description of the invention and which in fact are disposed near a bogie frame 1 are for reasons of clarity shown out of scale and in some cases as being disposed outside the bogie frame 1. The frame 1 is mounted by way of bearings (not shown) on the axles of three wheel sets whose wheels 2 each have a brake 3. In the very simplified illustration of FIG. 1, each brake 3 has a two-armed brake lever 4 pivoted to the frame 1 and a brake shoe 5 cooperating with the associated wheel 2. Each lever 4 is pivotally connected by way of one arm to a piston rod 6 of a piston 7 moving in a brake cylinder 8 of a service brake 10. The cylinders 8 are connected in known manner via a pressure line 11 to an actuation system 9 (not shown) for the brakes 10, the system 9 communicating with a compressed-air supply (not shown).

In order to operate the brakes 10, compressed air is supplied in known manner via the system 9 to the cylinders 8 so that the pistons 7 move to the left in FIG. 1, the levers 4 being pivoted correspondingly and applying the brake shoes 5 to the wheels 2. To release the brakes 10, the compressed air is discharged from the cylinders 8 so that the pistons 7 move back, in each case due to the effect of a spring system 7a, such that the brake levers 4 pivot clockwise in FIG. 1 and, correspondingly, the brake shoes 5 are disengaged from the wheels 2.

The brake levers 4 can also be adjusted by means of a handbrake system 12 comprising a hydraulic reciprocating actuator 13 for each brake lever 4. The actuators 13 are secured to the frame 1 and each have a piston rod 14 movingly coupled by way of a link 15 with the brake lever 4. Each link 15 is formed with a slot which engages a pin 16 on the associated brake lever 4. A clearance is provided such that, when the cylinders 8 operate the brake levers 4, the levers 4 can make the corresponding pivoting movement without moving the pistons of the actuators 13 with them by way of the links 15. The actuators 13 are connected by way of actuating lines 17, 18 to two hydraulic control means 21, 21a which, unlike what is shown in FIG. 1, are provided one each in the two driving cabs of the rail vehicle (not shown). Each control means 21, 21a is adapted to be controlled by means of a handwheel 22. Also, in a manner to be described hereinafter, each control means 21, 21a can be controlled by way of a connecting line 20 connected to the pressure line 11.

Referring to FIG. 2, each actuator 13 has a cylinder 26, a work piston 27 slidably mounted in the cylinder 26 and a piston rod 14 which cooperates with the associated brake lever 4 via the pin 6. The piston 27 separates a return cylinder chamber 28 connected to the line 17 from a work cylinder chamber 29 connected to the line 18. The link connection with the brake lever 4 secures the work piston 27 against rotation and secures the lever 4 against rotation.

Each actuator 13 also has a screw-threaded spindle 32 which extends from the work piston 27 and a reversible screw-threaded connection, in the form of a recirculating ball nut 31 and balls 33, between the spindle 32 and piston 27 to permit rotation of the spindle 32 relative to the piston 27. This connection 31, 32 is such as to maintain the spindle in a substantially immobile axial position. The balls 33 are guided in the nut 31 and spindle 32 in helical grooves of a pitch such to provide the reversible (non-self-locking) screwthreaded connection. Accordingly, every axial movement of the piston 27 is converted into a rotation of the spindle 32, the spindle having one end extending into an axial bore of the piston rod 14 to permit the relative movements of the screw-threaded connection. The other end of the spindle 32 has a head 35 which forms a friction brake member with a rotatable brake surface 36 thereon.

A release means is mounted at the end of the cylinder 26. This release means includes a cylindrical insert 38 in the cylinder 26 and a disengaging piston 43 slidably mounted in the insert 38. As shown, an end face 37 of the insert 38 serves as a stationary brake surface opposite the rotatable brake surface 36.

A compression spring 38 bears on a part 26a of the cylinder 26, which extends into the work cylinder chamber 29, and acts by way of a ball or roller radial bearing 41 on the head 35 to bias the head 35, as the moving element of the rotating friction brake, onto the insert 38. The spindle 32 is therefore secured against rotation by a frictional force corresponding to the force of the compression spring 39 and to the force which is applied via the work piston 27 and which is operative to the right in FIG. 2, so that the piston 27 is prevented from moving back. This back stop or return stop therefore remains operative in the presence of any rightwards-directed loading, even when the pressure in the work cylinder chamber 29 decreases to zero.

The disengaging piston 43 is adapted to move towards and away from the head 35 and separates an inner cylinder chamber 44 of the insert 38 from a disengaging-cylinder chamber 45. The head 35 is formed with bores 46 via which the inner chamber 44 communicates with the work cylinder chamber 29. The disengaging cylinder chamber 45 is connected via a line 47 to the pressure line 17.

The disengaging piston 43 is in the form of a pot-like member which has a cover 48 and whose base is formed with a port 50 adapted to be closed by valve lid 49a of a relief valve 49. The cover 48 has a striker cone adapted to meet axially with one race ring of the bearing 51 abutting axially on the head 35. The interior 53 of the disengaging piston 43 communicates, via ports 52 in the cover 48, with the cylinder chamber 44 and, via port 50, with the disengaging cylinder chamber 45.

The valve lid 49a has a conical seating surface which is engaged with the port 50 under the bias of a compression spring 54 disposed in the interior 53 of the piston 43. The lid 49a is disposed on a stem 55 which extends through the chamber 45 and an end-stop ring 56 into an axial bore 57 in the cover of the insert 38. The end of the stem 55 has a collar 58 adapted to move against the ring 56 to limit the operative movement of the lid 49a.

The control means 21 comprises a pump 61 which is adapted to be driven by way of the handwheel 22 and to which the two lines 17, 18 are so connected that, depending upon the direction in which the handwheel 22 is turned, pressure medium flows through one or other of the lines 17, 18. The lines 17, 18 which define means to supply and discharge pressure medium to and from the chambers of the actuator 13 are connected, via a respective intake line 63, 63a each having a respective check valve 62, 62a, to an oil sump 64. The line 18 includes a pressure-reducing valve 65 and a check valve 66 adapted to be flowed through only towards the work cylinder chamber 29. The reducing valve 65, which serves to limit the pressure of the pressure medium to be supplied to the work cylinder chamber 29, is so connected via line 20 to the compressed-air line 11 of FIG. 1 as to be set to a predetermined maximum pressure determined by the pressure in the line 11.

The lines 17, 18 are each connected via a respective line 67, 68 to a release valve 69 which is, in turn, connected to a return line 71 extending to the sump 64 and to a bypass line 72. The bypass line 72 terminates in that portion 18a of line 18 which interconnects the pump 61 and the valve 65, and the line 68 is connected to the line portion 18b connecting the check valve 66 to the actuator 13.

By way of two control lines 67a, 68a, the release valve 69 is connected to the lines 67, 68 respectively. By way of the control lines 67a, 68a, the release valve 69 can be adjusted between a closed position and two throughflow (open) positions, depending on the pressure difference between the cylinder chambers 28 and 29. In the closed position shown, communication between line 67 and return line 71 and between line 68 and bypass line 72 has been interrupted. When the lid 49a moves to the right in FIG. 2, i.e., when the pressure in the line 67 is correspondingly higher than in the line 68, the release valve 69 moves into its first open position to provide communication between line 68 and the bypass line 72. When the pressure difference between the two connecting lines 67 and 68 increases, the release valve 69 moves into its second open position which provides a further communication, in the form of a connection between the connecting line 67 and the return line 71.

The control means 21 also comprises a quick-release valve 73 disposed between, on the one hand, a connecting line 78 connected to the line portion 18a and, on the other hand, a substantially pressureless discharge line 71a extending to the sump 64. By way of a control line 77a connected to line 17 and by way of a control line 78a connected to line 78, and in accordance with a predetermined pressure differential between the lines 17 and 18, the valve 73 is adapted to be actuated between the closed position shown and a throughflow (open) position providing a communication between line portion 18b and the discharge line 71a.

For service operation of the handbrake means 21, the handwheel 22 in one of the driving cabs is rotated so that oil is delivered from line 17 through line 18 to the work cylinder chamber 29. As a result, the work piston 27 moves to the left as viewed in FIG. 2 until the brake lever 4 pivots counterclockwise and thus applies the brake 5. Since the piston surface near the return-cylinder chamber 29 is smaller than the piston surface near the work cylinder chamber 29, the quantity of oil to be supplied to the chamber 29 is greater than the quantity of oil displaced from the chamber 28. Consequently, the latter quantity is increased by an additional quantity of oil intake from the sump 64 through the intake line 63.

The leftwards movement of work piston 27 acts by way of the nut 31 to produce an axial force on the spindle 32 opposing the spring 39. Thus, there is a corresponding reduction in the force (produced by the spring 39) with which spindle end or head 35 bears on the end face 37. When the torque produced at the screwthreaded engagement of the nut 31 suffices to overcome the remaining friction between the friction surface 36 of the spindle head 35 and the end face 37 of the cylinder insert 38, the reversible screwthreaded connection starts to rotate the spindle 32 substantially without axial movement. Thus, the contact between the surface 36 and the end face 37 is maintained; all that occurs is a slip at a low pressure.

When the work piston 27 meets increased resistance during movement, i.e., when the associated brake shoe 5 engages with the wheel 2, the pressure in the work-cylinder chamber 29 increases to the predetermined value which is limited by the valve 65 and at which the valve 65 closes. Correspondingly, further operation of the pump 61 produces a considerable pressure rise in portion 18a of the line 18. This pressure rise is perceptible as a correspondingly sharp increase in the resistance of the handwheel 22. The operator is therefore made aware that the brake application operation is complete.

To release the brake, the pump 61 is rotated in the opposite direction by means of handwheel 22 so that oil goes from the line portion 18a, now closed by the check valve 66, and through intake line 63a from sump 64 into line 17 and connecting line 47. Correspondingly, there is a flow of oil into the return cylinder chamber 28 and into the disengaging cylinder chamber 45 and therefrom - when the relief valve 49 opens into the interior 53 of the disengaging piston 43. From interior 53, the oil goes through the ports 52 of the cover 48 and through the ports 46 of the spindle head 35 into the work cylinder chamber 29. At this time, the relief valve 49 produces a reduced pressure drop between the disengaging cylinder chamber 45 and the interior 53 i.e., the work cylinder chamber 29 connected thereto. The check valve 66 prevents any outflow of oil from the work cylinder chamber 29.

The disengaging piston 43, which was forced into the right-hand end position shown in FIG. 2 when the brake 3 was applied, moves to the left because of the reduced pressure difference between the disengaging-cylinder chamber 45 and the work-cylinder chamber 29 until the cover 48 contacts the bearing 51. Since the force resulting from the pressure difference is much less than the bearing force of the spindle 32, such bearing force being exerted by the applied brake and by the spring 39, no disengaging movement of spindle head 35 is initiated.

When the pump 61 delivers oil to the lines 17 and 47, the pressure in the return cylinder chamber 28, the disengaging cylinder chamber 45 and—less the pressure drop in the relief valve 49—in the work cylinder chamber 29 rises. Thus, the work piston 27 experiences a leftwards force in the sense of an application of the brake. Upon a further increase in pressure, the axial force tending to move the work piston 27 to the right is increasingly taken up by the opposed pressing force corresponding to the pressure in the work cylinder chamber 29 and applied by way of the large face of work piston 27. Thus, there is a corresponding decrease in the axial force which the nut 31 transmits to the spindle 32. Once the latter force drops below the force of the disengagement piston 43, the last-mentioned force arising from the pressure difference between the disengaging cylinder chamber 43 and the work cylinder chamber 29, the spindle 32 disengages from the end face 37 to release the rotating friction brake. The axial force then ceases to be applied via the nut 31 to the spindle 32. The piston 43 and spindle 32 therefore move abruptly to the left into the position which can be seen in FIG. 2a and in which the collar 58 of the valve stem 55 is in contact with the ring 56 and the valve seat surface of the disengaging piston 43 is pressed onto the lid 49a, so that port 50 is in the closed state.

Further operation of the pump 51 in the sense of supplying oil to the return cylinder chamber 28 increases the pressure therein but provide little—i.e., only to a minor extent due to the multiplicative action of the differential piston surfaces—pressure increase in the work cylinder chamber 29 since the constrained closure of the relief valve 49 prevents oil from being supplied from the disengaging cylinder chamber 45 to the work cylinder chamber 29. The absolute pressure difference between the return cylinder chamber 29 and the work cylinder chamber 29 therefore rises abruptly to a predetermined value sufficient to act via connecting line 67a to move the release valve 69 from the closed position in FIG. 2 to its first open position in which oil can flow from the work cylinder chamber into line portion 18a. The pump 61 therefore ceases to intake oil through line 63a from sump 64 but intakes directly from work cylinder chamber 29. Consequently, the work piston 27 can be moved back by the load acting on the piston 27 at an accurately controllable speed, depending on the quantity of oil removed from the chamber 29.

Since the pump 61 intakes more oil from the chamber 29 than it delivers to the return-cylinder chamber 28, the pressure in the chamber 28 and in the line 17 continues to rise until the release valve 69 is moved by way of the line 67a to its second open position to act as a relief valve allowing the surplus oil delivered to the line 17 to return to the sump 64. Consequently, throughout the remainder of the release operation, the pressure in the line 17 has a value which is determined by the setting of the release valve 69 and which is higher by a constant amount than the pressure in the line 18. The work piston 27 moves back correspondingly, the external force which acts on the piston 27 being reduced because of the resilience of the brake linkage. The pressures in the two lines 17, 18 therefore decrease, so that the relationship between the latter pressures increases correspondingly.

If, for instance, the constant pressure difference is 5 bar and the pressure associated with a high braking force are e.g. 105 and 100 bar, the relationship is 1.05. The relationship is 3.5 when the pressures drop to e.g. 7 and 2 bar.

The maximum external pressure operative on the work piston 27 occurs only during a relatively short first phase of brake release, whereas the correspondingly reduced external pressure, e.g. because of the springing 7a in the cylinders 8, is effective over a relatively long return travel. It is desirable for the latter travel to be passed through very rapidly. Consequently, as soon as the predetermined higher pressure relationship has been reached, the correspondingly adjusted quick-release valve 73 opens to provide a direct discharge from line portion 18b, so that the oil displaced from the work cylinder chamber 29 goes directly to the sump 64. The quantity of oil to be delivered by the pump 61 is therefore intaken entirely through line 63a from the sump 64. The rate of return of the work piston 27 is therefore determined by the quantity of oil delivered to the return cylinder chamber 28 and not by the quantity of oil discharging from the work cylinder chamber 29 and by the corresponding surface of the work piston 27, as during the previous phases of brake release. The rate of return of the workpiston 27 can therefore be much faster than previously, e.g. six times faster.

A great advantage of the system according to the intention is that any number of parallel-connected actuators 13 can be operated jointly, all of them having the same pressures in the corresponding cylinder chambers and therefore producing the same braking forces. Correspondingly, however many brake systems there are, brake application and release proceeds synchronously in all of them. A particular feature of brake release is that the common return movement of all the work pistons 27 can begin only when the spindles 32 of all the actuators 13 have disengaged from their associated end faces 37 so that all the relief valves 49 are in the closed state, thus interrupting the communication between each disengaging cylinder chamber 45 and the associated work cylinder chamber 29. Only then can the pressure difference between the cylinder chambers 28 or 45 and 29 which is necessary to operate the element 69 build up.

Figure 3A:
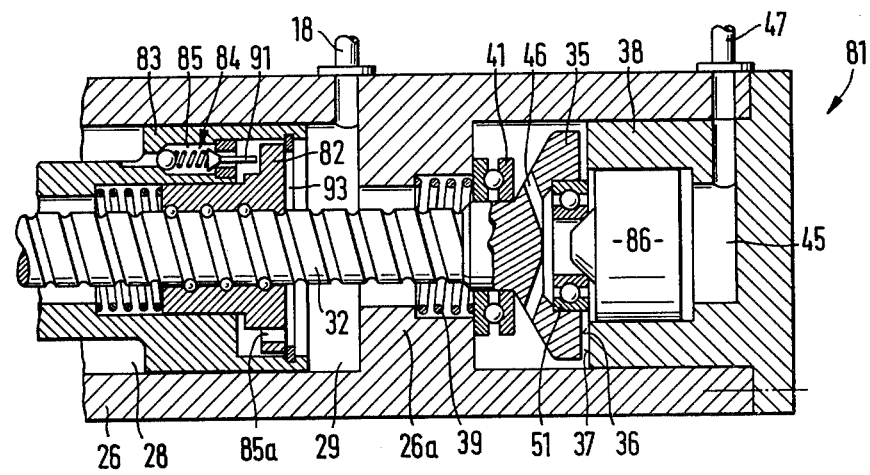
FIG. 3a illustrates a detail of FIG. 3 in a different operating position.
Figure 3:
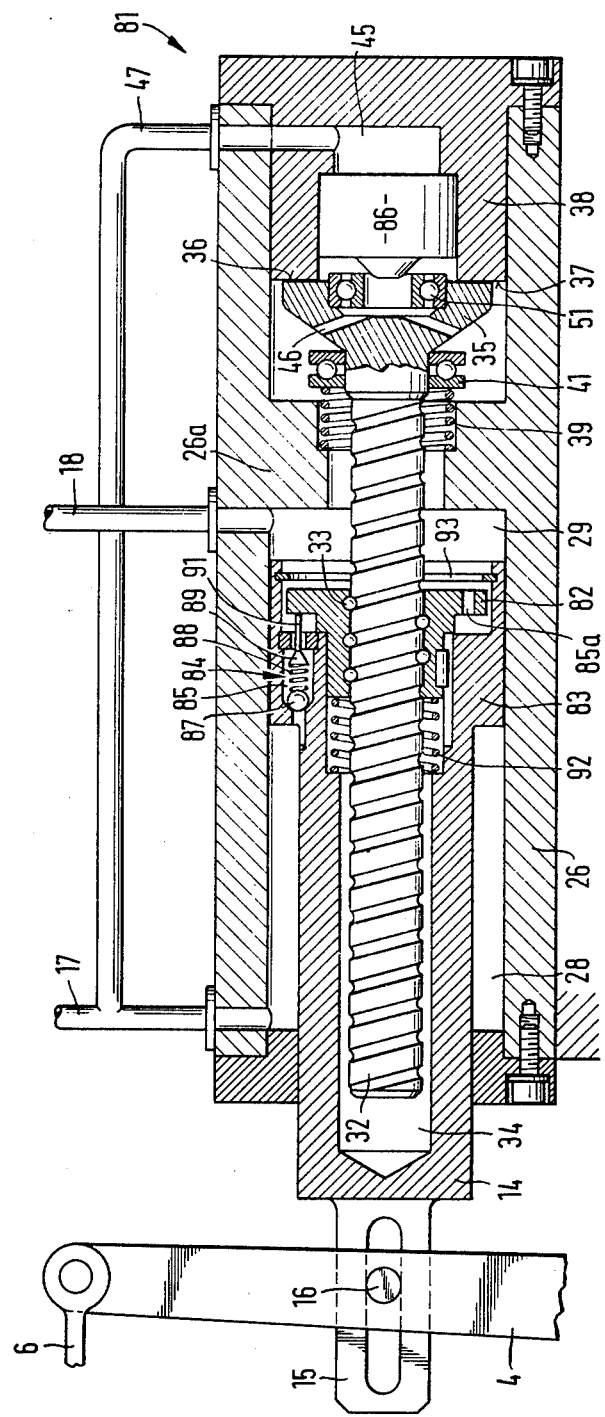
FIG. 3 illustrates another embodiment of a reciprocating actuator according to the invention.

Referring to FIG. 3, in an alternative construction the spindle 32 of the reciprocating actuator 81 can be guided in a recirculating ball nut 82 so secured in a work piston 83 as to fixedly rotate with the spindle 32 but with provision for limited axial movement of e.g. 1 millimeter (mm). In this case, the work piston 83 is formed with three ports 85 which are peripherally distributed and each of which houses a relief valve 84, only one of which is visible. The ports 85 and three corresponding ports 85a in the nut 82 can provide communication between the return cylinder chamber 28 and the work cylinder chamber 29. The spindle 32 co-operates with a disengaging piston 86 which provides a seal-tight closure of the disengaging cylinder chamber 45 from the work cylinder chamber 29.

Each relief valve 84 has two valve lids 87, 89 biased apart from one another by a compression spring 88, the lids 87, 88 closing the port 85 relative to the chambers 28, and 29 respectively (FIG. 3a). The lid 89 has a stem 91 which extends out of the port 85 into the range of movement of the nut 82. When the spindle 32 is under load and is kept locked by the rotating friction brake, the nut 82, which bears on the work piston 83 as shown in FIG. 3, disengage the lids 89 from their respective valve seats so that the ports 85 can be flowed through towards the chamber 29. When, as shown in FIG. 3a, there is no load on the spindle 32 and the spindle 32 is not in engagement with the cylinder insert 38, a compression spring 92 disposed in the work piston 82 disengages the nut 82 from abutment in the work piston 83 and from the stems 91 and presses the nut 83 against a stop ring 93. The unloaded lids 89 close the ports 85 relative to the chamber 29.

Basically, the actuator 81 operates similarly to the actuator 13 of FIG. 1 except that the pressure difference between the disengaging cylinder chamber 45 and the work cylinder 29, which is necessary to reduce the axial loading of the spindle 32 and therefore to release the rotating friction brake, is produced by the pressure drop in the relief valve 84 disposed near the work piston 83.

A number of actuators 81 can be operated in parallel in the construction since the transfer of pressure medium from the chamber 28 to the chamber 29 ceases only when each of the spindles 32 of all the actuators 81 has disengaged from the corresponding insert 38 so that all the valves 84 are in the closed state.

Figure 4:
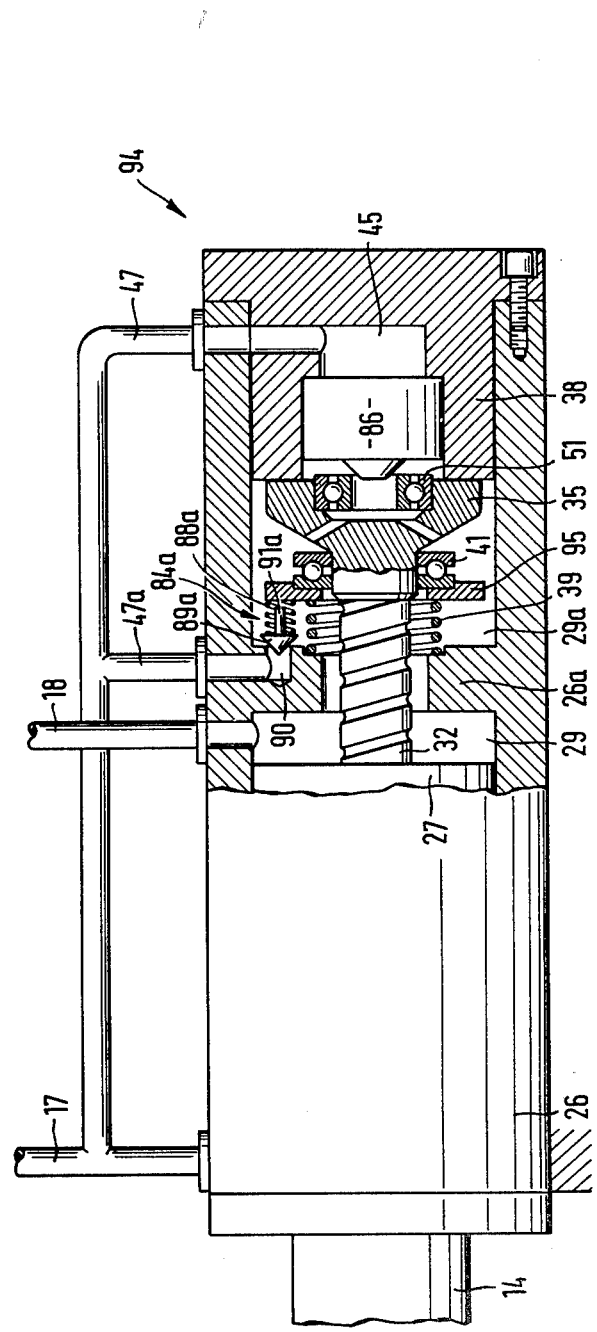
FIGS. 4 illustrates a view of a modified actuator having a relief valve within the work cylinder chamber in accordance with the invention.

Referring to FIG. 4, the reciprocating actuator 94 may also have three relief valve 84a, only one of which is visible, which cooperate with ports 90 disposed in a cylinder part 26a. The ports 90 communicate via a branch line 47a with the connecting line 47 and terminate in a part 29a of the work cylinder chamber 29, encompassing the spindle head 35. The bearing 41 in this case has a thrust ring 95 which cooperates with each of the relief valves 84a by way of a compression spring 88a.

Each relief valve 84a comprises a lid 89a which has a stem 91a and which, in the closed position shown in FIG. 4 with the spindle 32 under load and locked by the rotating friction brake, closes the corresponding port 90. When pressure medium is supplied through the line 47a, each lid 89a disengages from the associated valve seat and moves out of the closed position shown so that the ports 90 can be flowed through towards the chamber part 29a. The operative movement of the valve is limited by the thrust ring 95 which forms an abutment for the stems 91a. When the spindle 32 is in the unloaded state and disengaged from the insert 38, the ring 95 presses the lids 89a onto their valve seats so that the ports 90 are closed for a supply of pressure medium to the work cylinder chamber 29.

When the work piston 27, 83 have been moved operatively - i.e., extended and locked, the actuators 13, 81, 94 described with reference to FIGS. 2, 3 and 4 act basically as rigid elements.

Referring to FIG. 5, in order to prevent impairment of the actuating system as a result of alterations in external forces, e.g. to prevent release of the brakes as a result of temperature variations, the disengaging piston 43 of a reciprocating actuator 96 is disposed in a piston-like axially movable cylinder insert 97. As shown, the insert 97 abuts by way of a compression spring 98 on a cylinder head 99 and is guided axially by a means to prevent rotation, e.g. a square shaped pin 101 disposed on the head 99 and received in a mating recess of the insert 97. Correspondingly, the insert 97 is formed with an annular groove 102 of a width such that in every operative position of the insert 97, the connecting line 47 extends to the region of the groove 102. Connecting ducts 103 extend to the disengaging cylinder chamber 45. The insert 97, which experiences the torque of the spindle 32, is secured against rotating. The effective piston area 100 of the insert 97 is equal to the effective piston area of work piston 27 but can be larger or smaller.

Referring to FIG. 6, the reciprocating actuator 104 may alternatively comprise a cylinder insert 105 which takes the form of a differential piston and which is guided by way of a collar 105a in an annular groove 106 in the cylinder 26. The large piston face 100 of the insert 105 experiences the pressure of the work cylinder chamber 29 while the pressure of the disengaging cylinder chamber 45 or the identical pressure of the return cylinder chamber 28 acts on the annular difference face 107. The characteristic of the locking and release events can therefore be so controlled that the piston force in the locked state is not the same as the force at the end of the brake application. That is, unlocking does not occur with the same force as locking. Of course, this feature can provide a virtually infinite amount of combinations.

The axially mobile or resilient mounting of the cylinder insert 97, 105 of FIGS. 5 and 6 respectively is very advantageous in connection with the use of the actuators 96, 104 in handbrake systems of the kind shown in FIG. 1. In such systems, it may happen that the brakes are applied both by way of the brake cylinders 8 and by way of the actuators of the handbrake system 12. The result is that the braking force is virtually doubled. When the load of the cylinders 8 is reduced assuming that a construction having an axially stationary cylinder insert is used—twice the braking force would have to act on the locking mechanism of the actuator units, and so the actuator mechanism might be overstressed. Consequently, in systems of this kind normal release of the handbrake must be preceded by a renewed energization of the cylinders 8 since the unlocking of the acturators occur at a much higher pressure than the intended pressure and the unlocking pressure would have to be produced by the pump 61. Thus, the force which would have to be used on the handwheel 22 would be doubled. However, if the actuators 96 or 104 of FIGS. 5 and 6 are used, the adjusting force remains substantially constant, there is no overstressing and there is therefore little extra difficulty in the release operation.

Referring to FIG. 7, the work piston 109 of a reciprocating actuator 108 may also be rigidly connected to a screwthreaded spindle 111 cooperating with a recirculating ball nut 112 rotatably mounted in the cylinder 26. In this embodiment, the friction surface 36 of the rotating friction brake is provided on the nut 112 and cooperates with the cylinder insert 38. In other respects, the operation of this construction is very similar to the operation of the construction of FIG. 2.

FIG. 8 shows another construction of a reciprocating actuator 115 having a non-rotating spindle 116 and a rotatable - i.e., brakable - recirculating ball nut 112. In this construction, the spindle 116 is mounted by way of a head 118 for axial movement in a work piston 117 housing the relief valve 84 and the port 85. Correspondingly, the ports 85a are disposed in the spindle head 118 which cooperates with the valve stem 91. In other respects, the operation of this construction is very similar to the operation of the construction of FIG. 3.

Figure 9:
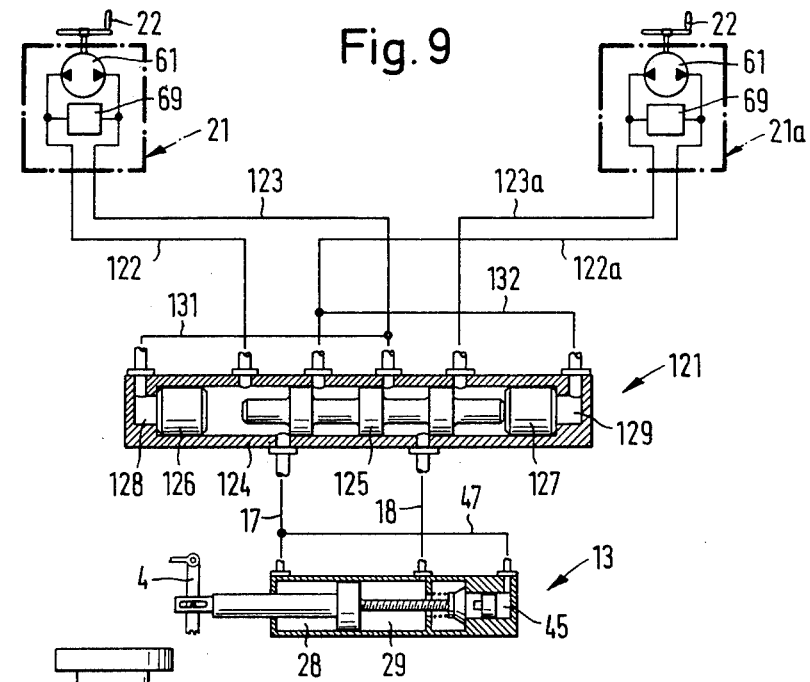
FIG. 9 illustrates a schematic view of a pair of control means for actuating an actuator in accordance with the invention.

If there are two control means 21, 21a (FIG. 1) and any number of actuators, the brakes can be applied in known manner from one of the driver's cabs and be released from the same cab or from the other cab. To avoid breakdown of the complete system and to control the system from at least one of the two control means 21, or 21a in the event of breakage of one of the lines 17 or 18, each actuator 13 may be connected, as shown in FIG. 9, to a two-circuit valve 121 via the lines 17 and 18. The valve 121 is connected to each of the two control means 21 and 21a via two control lines 122, 123 and 122a, 123a. The control lines 122, 122a are for energization on the release of the locked actuator 13, while the control lines 123, 123a are each pressurized via the associated pump 61 for service operation, i.e. to apply the brakes 3 in this example.

The two circuit valve 121 comprises a casing 124 in which a spool 125 is disposed for movement between two free pistons 126 and 127 each of which defines a cylinder chamber 128, 129 at the associated end of the cylinder, with respect to the space in which the spool 125 moves. The two cylinder chambers 128 and 129 are each connected to the control lines 123, 122a via a connecting line 131, 132 respectively.

In the position of the spool 125 illustrated, the lines 17 and 18 are connected to the control means 21 via the control lines 122 and 123. The control lines 122a and 123a associated with the control facility 21a are shut off. It will be apparent from the position of the free piston 126 that the control line 122 has been pressurized via the pump 61 to carry out the release operation. Thus, the spool 125 has been displaced towards the free piston 127 and the free piston 126 has been displaced into the left-hand end position in FIG. 9. Accordingly, in the position illustrated, the return cylinder chamber 28 and the disengaging cylinder chamber 45 of the actuator 13 are pressurized while the work cylinder chamber 29 is connected to the now pressureless control line 123 via the line 18.

If the control line 123 together with the connecting line 131 and the work cylinder chamber 29 are pressurized from the same control means 21 by the pump 61 being driven in the other direction of rotation the control line 122 and the cylinder chambers 28 and 45 become pressureless. The free portion 126 is then moved to the right. This movement does not trigger any function when the spool 125 is in the position illustrated. If, on the other hand, the spool 125 were in the left-hand position as a result of a previous operation of the control means 21a, the spool 125 would be pressed by the spool 126 to the right into the position illustrated.

If one of the control lines 122a or 123a is pressurized from the control means 21a, the spool 125—in the case of actuation via the control lines 123a alone or actuation via the control line 122a together with the free piston 127—moves to the left in FIG. 9 and connects each of the lines 17 and 18 to the associated control line 122a and 123a.

Advantageously, although not illustrated, the control lines 122, 123, 122a, 123a of whichever control means 21, 21a has not been operated are pressureless to enable the oil displaced on each movement of the spool 125 to flow off in the pressureless state. A control means of this kind may be so coupled, for instance, to a reversal valve on each pump 61 such that, in a central position, there is a connection to allow oil to flow off to the sump from the two control lines associated with the same pump 61. Advantageously, the release line pressure should first be reduced to ensure satisfactory re-locking when the release operation is interrupted.

Figure 10:
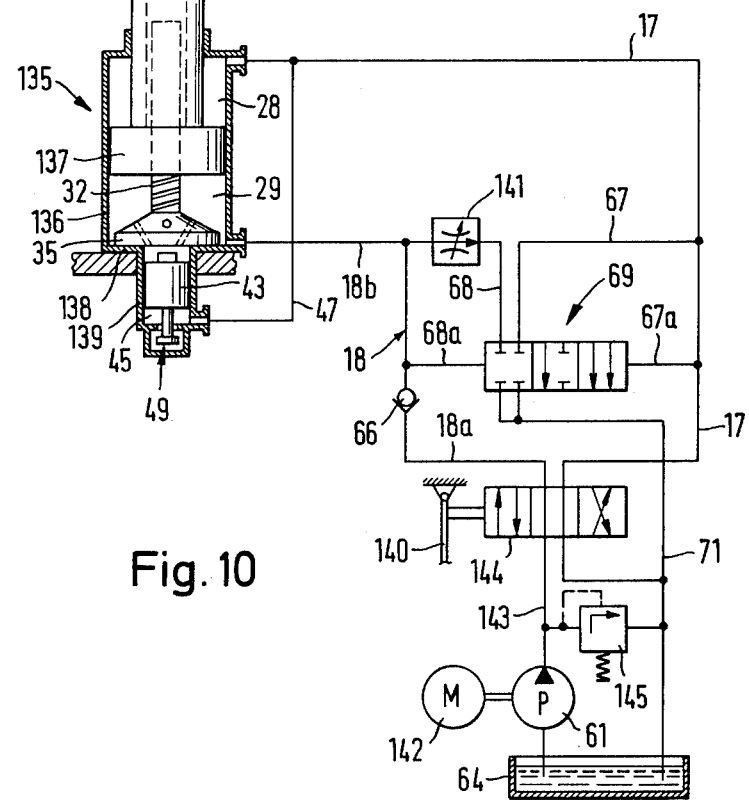
FIG. 10 shows a variant of another actuation system according to the invention.

The invention is not restricted to hand brake facilities with hand-driven pumps. For example, referring to FIG. 10, the reciprocating actuator 135 may have a cylinder 136, a reciprocating piston 137 biased via a spindle 32 on a shoulder 138 of a cylinder 136 to which a disengaging cylinder 139 is connected. A connecting line 68 contains a means such as a flow control valve 141 for controlling the quantity of oil discharged from the work cylinder chamber 29 after release of the rotating friction brake, when the piston 137 descends (returns). In construction employing a plurality of actuators 135 having unequal loading, each such actuator preferably has its own control valve 141.

The pump 61, driven by a motor 142 is connected via a pressure line 143 to a control valve 144 adjustable by a hand lever 140 or any other suitable facility, from the closed position illustrated into two open positions in which the valve 144 optionally connects the pressure line 143 to one of the lines 17 or 18 and the other line 18 or 17 to the return line 71. The pressure line 143 is connected to the return line 71 via a pressure limiting valve 145 which returns to the sump 64 the excess oil delivered by the pump 61 and also limits the pressure evolved when the piston 137 is raised.

The operation of this embodiment is substantially the same as that of the other embodiments described. The piston 137 is held in position at any time by the rotating friction brake and is lowered with a correspondingly controlled movement only when there is a predetermined pressure difference between the cylinder chambers 28 or 45 and 29, in accordance with the controlled quantity of oil flowing out of the work cylinder chamber 29.

Various other embodiments of the invention are possible. For example, with a reciprocating actuator there is no need for a separately energized return cylinder chamber 28. Thus, only the disengaging cylinder chamber 45 is connected to the line 17 and the piston 137 descends without hydraulic actuation of its own accord by the external force acting thereon.

What is claimed is:

1. An hydraulic brake actuation system for a rail vehicle comprising at least one double-acting reciprocating actuator for selectively engaging and disengaging a brake, said actuator including
   a cylinder;
   a work piston slidably mounted in said cylinder to define a return cylinder chamber on one side and a work cylinder chamber on an opposite side thereof;
   a screw-threaded spindle extending from said piston;
   a reversible screw-threaded connection between said spindle and said work piston to permit rotation of said spindle relative to said piston;
   a friction brake member mounted on said spindle, said member having rotatable brake surface thereon;
   a release means including an insert in said cylinder having a stationary brake surface opposite said rotatable brake surface, and a disengaging piston slidably mounted in said insert to selectively move said friction brake member away from said insert and to define a disengaging cylinder chamber in said insert, said disengaging piston being disposed in facing relation to said rotatable brake member to separate said disengaging cylinder chamber from said work cylinder chamber; and
   a relief valve between said disengaging cylinder chamber and said work cylinder chamber, said valve being movable between a closed position for blocking communication between said disengaging cylinder chamber and said work cylinder chamber with said brake surfaces in spaced relation and an open position for communicating said disengaging cylinder chamber with said work cylinder chamber with said brake surfaces in contact with each other.

2. A hydraulic brake actuation system as set forth in claim 1 wherein said relief valve is disposed on said disengaging piston.

3. A hydraulic brake actuation system as set forth in claim 1 wherein said cylinder has a part projecting into said work cylinder chamber and having at least one bore therein to communicate externally with said disengaging cylinder chamber, and wherein said relief valve is disposed on said casing part to selectively open and close said bore to said work cylinder chamber.

4. A hydraulic brake actuation system as set forth in claim 1 wherein said insert is slidably mounted in said cylinder and wherein said release means further includes a spring biasing said insert towards said spindle against the pressure in said work cylinder chamber, and means for preventing rotation of said insert in said cylinder.

5. A hydraulic brake actuation system as set forth in claim 1 wherein said insert is in the form of a differential piston having an annular piston surface in communication with said disengaging cylinder chamber, said piston surface being disposed on a side of said differential piston opposite said work cylinder chamber.

6. A hyraulic brake actuation system as set forth in claim 1 wherein said actuator further includes a spring biasing said brake member towards said insert and away from said work piston.

7. A hydraulic brake actuation system as set forth in claim 1 which further comprises a hydraulic control means for actuating said actuator, said control means including
   means for supplying a pressure medium to said chambers;
   means for discharging pressure medium from said chambers;
   a pair of control lines, each control line being respectively connected to said work cylinder chamber and said disengaging cylinder chamber; and
   a release valve between said control lines, said release valve being connected to said work cylinder chamber and being responsive to a predetermined pressure difference between said work cylinder chamber and said disengaging cylinder chamber to move from a closed position into at least one open position to communicate said work cylinder chamber with said means for discharging pressure medium.

8. A hydraulic brake actuation system as set forth in claim 7 wherein said control means further includes a means for regulating the quantity of pressure medium discharged from said work cylinder chamber after release of said rotatable brake surface.

9. A hydraulic brake actuation system as set forth in claim 8 where said regulating means is a variable speed pump.

10. A hydraulic brake actuation system as set forth in claim 7 wherein said control means further includes
    a substantially pressure-less discharge line for pressure medium;
    a pair of control lines, each control line being respectively connected to said work cylinder chamber and said disengaging cylinder chamber; and
    a quick release valve between said control lines, said quick release valve being connected to said work cylinder chamber and being responsive to a predetermined pressure difference between said work cylinder chamber and said disengaging cylinder chamber to move from a closed position into an open position to communicate said work cylinder chamber with said discharge line.

11. A hydraulic brake actuation system as set forth in claim 1 which further comprises a pair of hydraulic control means for selectively actuating said actuator, and a two-circuit valve connected to said control means to connect a selected one of said control means to said actuator.

12. A hydraulic brake actuation system for a rail vehicle comprising at least one double-acting reciprocating actuator for selectively engaging and disengaging a brake, said actuator including
    a cylinder;

a work piston slidably mounted in said cylinder to define a return cylinder chamber on one side and a work cylinder chamber on an opposite side thereof;

a screw-threaded spindle secured to and extending from said work piston;

a recirculating ball nut rotatably mounted on said spindle and in said cylinder, said nut having a rotatable brake surface thereon;

a release means including an insert in said cylinder having a stationary brake surface opposite said rotatable brake surface and a disengaging piston slidably mounted in said insert to selectively move said nut away from said insert and to define a disengaging cylinder chamber in said insert, said disengaging piston being disposed in facing relation to said nut to separate said disengaging cylinder chamber from said work cylinder chamber; and a relief valve between said disengaging cylinder chamber and said work cylinder chamber, said valve being movable between a closed position for blocking communication between said disengaging cylinder chamber and said work cylinder chamber and an open position for communicating said disengaging cylinder chamber with said work cylinder chamber.

13. A system as set forth in claim 12 wherein said relief valve is disposed in said disengaging piston.

14. A system as set forth in claim 12 wherein said actuator further includes a spring biasing said nut towards said insert.

15. A system as set forth in claim 12 wherein said spindle is axially movable relative to said work piston and said relief valve is disposed in said work piston.

16. A system as set forth in claim 15 wherein said work piston includes at least one part in communication at one end with said return cylinder chamber and said disengaging cylinder chamber and at an opposite end with said work cylinder chamber, said relief valve being disposed in said bore to be in said open position with said braking surfaces in spaced relation and in said closed position with said braking surfaces being in contact with each other.

* * * * *

UNITED STATES PATENT AND TRADEMARK OFFICE
CERTIFICATE OF CORRECTION

PATENT NO. : 4,201,277
DATED : May 6, 1980
INVENTOR(S) : Meier, Bruno, et al.

It is certified that error appears in the above—identified patent and that said Letters Patent is hereby corrected as shown below:

Column 1, line 5, change "The" to -- This --.

Column 10, line 11, change "valve" to -- valves--.

Column 11, line 22, change "occur" to -- occurs --.

Column 12, line 25, change "portion" to -- piston --.

Column 14, line 12, change " hyraulic" to -- hydraulic --.

Signed and Sealed this

Twenty-third Day of September 1980

[SEAL]

Attest:

SIDNEY A. DIAMOND

Attesting Officer

Commissioner of Patents and Trademark